United States Patent
Brown

(10) Patent No.: US 7,376,911 B2
(45) Date of Patent: May 20, 2008

(54) METHOD AND SYSTEM FOR CONTROLLING SCREEN FOCUS FOR FILES AND APPLICATIONS DURING PRESENTATIONS

(75) Inventor: Joe Nathan Brown, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 10/850,391

(22) Filed: May 20, 2004

(65) Prior Publication Data

US 2005/0262083 A1    Nov. 24, 2005

(51) Int. Cl.
  G06F 3/00    (2006.01)
  G06F 3/048   (2006.01)
(52) U.S. Cl. .................... 715/802; 715/730
(58) Field of Classification Search .......... 715/802, 715/808, 730
  See application file for complete search history.

(56) References Cited

U.S. PATENT DOCUMENTS

| | | | | |
|---|---|---|---|---|
| 5,917,480 A * | 6/1999 | Tafoya et al. | ............... | 715/732 |
| 6,031,530 A * | 2/2000 | Trueblood | ............... | 715/791 |
| 6,091,408 A * | 7/2000 | Treibitz et al. | ............... | 715/753 |
| 6,384,853 B1 * | 5/2002 | Shaffer et al. | ............... | 715/867 |
| 6,594,767 B1 * | 7/2003 | Wiley et al. | ............... | 713/300 |
| 6,717,595 B1 * | 4/2004 | Yennaco | ............... | 715/765 |
| 6,778,194 B2 * | 8/2004 | Jones | ............... | 715/808 |
| 7,091,994 B2 * | 8/2006 | Hayashi et al. | ............... | 345/629 |
| 7,131,068 B2 * | 10/2006 | O'Neal et al. | ............... | 715/730 |
| 2004/0218036 A1 * | 11/2004 | Boss et al. | ............... | 348/14.08 |
| 2005/0091608 A1 * | 4/2005 | Gusmorino et al. | ............... | 715/801 |
| 2005/0198589 A1 * | 9/2005 | Heikes et al. | ............... | 715/805 |
| 2007/0162858 A1 * | 7/2007 | Hurley et al. | ............... | 715/732 |

* cited by examiner

*Primary Examiner*—Weilun Lo
*Assistant Examiner*—David Phantana-angkool
(74) *Attorney, Agent, or Firm*—Mitch Harris, Atty at Law, LLC; Andrew M. Harris; Casimer K. Salys

(57) ABSTRACT

A method and system for controlling screen focus for files and applications during presentations provides for protection of information in a computer-generated presentation setting and prevention of interruption of a presentation by unwanted computer activity. A list is built of applications and files for which screen access is permitted during the presentation. Upon an indication that the presentation is active, when an application or file is about to obtain screen focus, the list is checked to determine whether access is permitted for the file or application. If the application or file is should not have the focus, execution of an application or opening of a file is blocked, or screen focus is denied to windows generated in conjunction with application or file. The indication that the presentation is active may be the connection of a particular display type (e.g., a projector) or the use of a certain display port.

7 Claims, 3 Drawing Sheets

METHOD AND SYSTEM FOR CONTROLLING SCREEN FOCUS FOR FILES AND APPLICATIONS DURING PRESENTATIONS

BACKGROUND OF THE INVENTION

1. Field of the Invention

The present invention is related to computer systems and operating system/application software, and more particularly to a method and system that prevent the display of undesirable information during a computer-generated presentation.

2. Description of Related Art

General-purpose computer systems are commonly used for providing computer-generated presentations. The typical set-up used to provide such presentations is a liquid-crystal-display (LCD) projector having a video graphics adapter (VGA) port attached to a notebook computer system, typically the notebook computer system used personally by the presenter.

The aforementioned set-up permits a presenter to develop and transport a presentation to a remote site, such as a lecture hall, with the assurance that the presentation is under the control of the presenter with respect to both content and operability.

However, there are several conditions that might interrupt or compromise a presentation. The presenter may activate other programs or open files as part of the presentation, in order to make side points or to supplement the presentation. If the presenter accidentally activates an unintended file or program, information displayed as a result may result in the exposure of sensitive data, cause embarrassment, or in the least part will interrupt the flow of the presentation.

Further, automatic response of programs or operating systems facilities may cause interruption of a presentation. In particular, pop-up applications serving Internet communications such as instant messaging applications, may gain screen focus and control of user input during a presentation, which is highly undesirable. With the advent of widespread wireless local-area-network (WLAN) connectivity, it is even more likely that such problems will occur, as the presenter would have to disable the WLAN connection or any programs or services that might become active in response to a network request. The presenter would then have to re-enable the disabled features when the presentation was complete. Such reconfiguration is inconvenient and susceptible to human error.

Therefore, it would be desirable to provide a method and system for preventing interruption and/or display of undesired information during computer-generated presentations.

SUMMARY OF THE INVENTION

The above objectives of preventing interruption and/or display of undesired information during computer-generated presentations is provided in a method and system for controlling screen focus for files and applications during a computer-generated presentation.

The method may be embodied in a computer system executing program instructions for carrying out the steps of the method and may further be embodied in a computer program product containing program instructions in computer-readable form for carrying out the steps of the method.

A list of applications and files for which screen display is permitted during a presentation is built prior to the presentation. Upon an indication that a presentation is active, when a window for a file or application is about to obtain screen focus, the list is checked to determine whether to permit the focus to pass to the window. If the application or file is not in the list the focus change is blocked. The blocking may be performed by control of the window focus or by preventing the opening of the file if it is not already open.

Determination of whether the presentation is active may be made directly—by a setting in or by the presentation program or by detection of the use of a particular display type or port, such as an LCD projector.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

Figure 1:
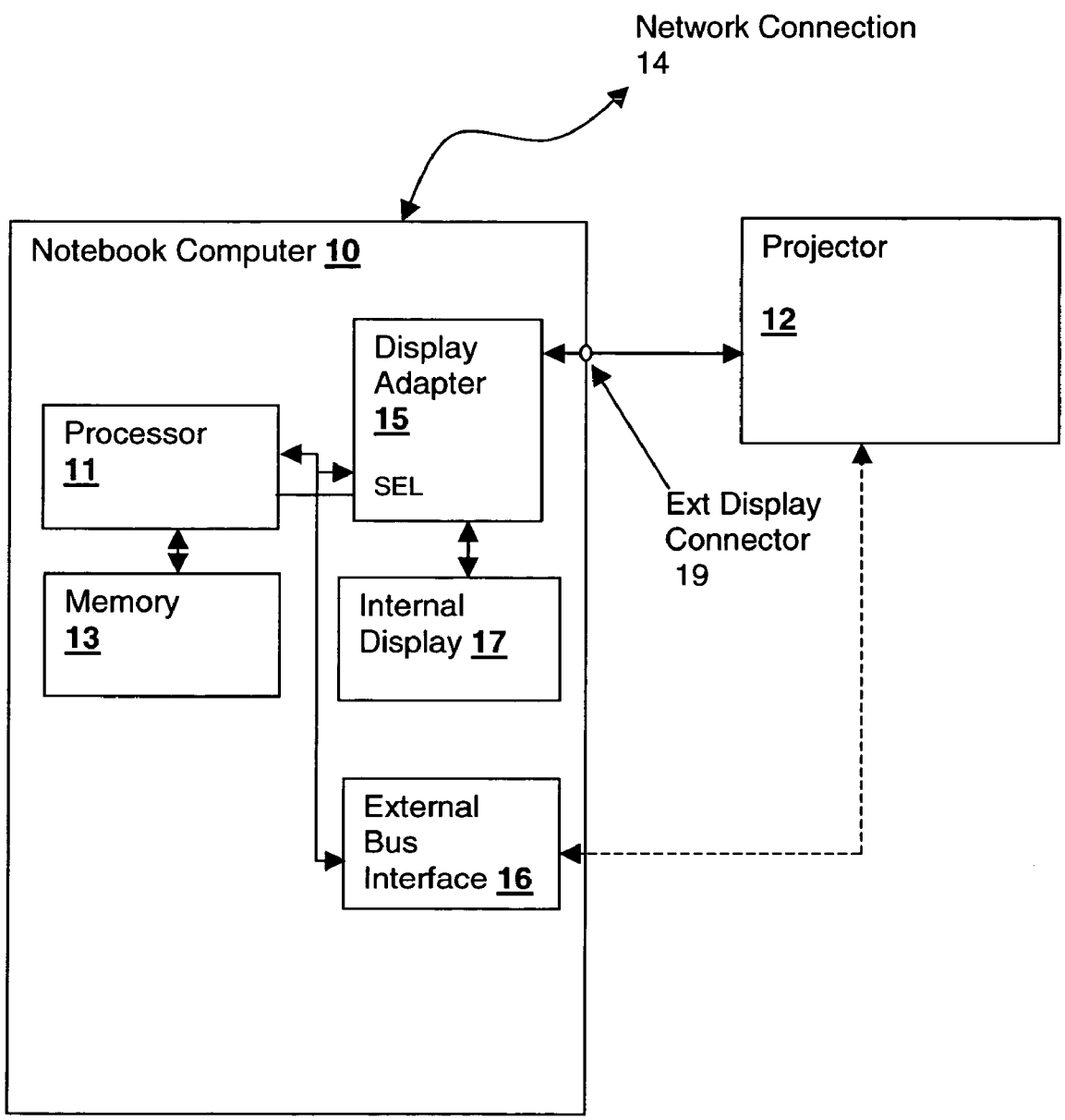
FIG. 1 is a pictorial diagram of a computer system in which methods in accordance with an embodiment of the present invention are performed.

Referring to the figures, and particularly to FIG. 1, a computer system, in which methods according to an embodiment of the present invention are performed, is depicted. A notebook computer 10, having a processor 11 coupled to a memory 13, for executing program instructions from memory 13, is shown. Network connection 14 may be wired or wireless and couples notebook computer 10 to the Internet or other network.

The program instructions include program instructions for executing one or more methods in accordance with an embodiment of the present invention. The methods of the present invention are directed toward controlling operation of the computer system during a presentation, so that undesirable information is not presented during the presentation or that the presentation is not otherwise interrupted.

Notebook computer 10 includes a display adapter 15 coupled to an internal LCD display 17 and an external display connector (generally a VGA port) 19 to which an external projector 12 is attached. Alternatively, external projector 12 may be connected to an external bus interface 16 of notebook computer 10, such as a universal serial bus (USB) or IEEE1394 (FIREWIRE or ILINK) adapter. (In the bus attachment configuration, projector 12 includes the functionality of display adapter 15 such as screen memory and rasterizing hardware). Preferably, connection of projector 12 is detected by a hardware mechanism such as plug-and-play (PnP) monitor ID detection through display connector 19 or by device detection on external bus interface 16. A wireless-connected projector may also be found through indications provided by a wireless network stack or interface driver. A program in accordance with an embodiment of the present invention may use the device type (e.g., projector) or the use of an external connector such as display connector 19 or connection of a display device on bus interface 16 as an indication that a presentation is active, either alone or in combination with other techniques for presentation activity determination as will be described in further detail below. In general, hardware-based information will be provided by information structures and/or procedure calls available from the operating system and/or built-in-operating-system (BIOS) of notebook computer 10. The information will then be optionally used by a program embodying the method of the present invention to decide whether or not a presentation may be active.

Figure 2:
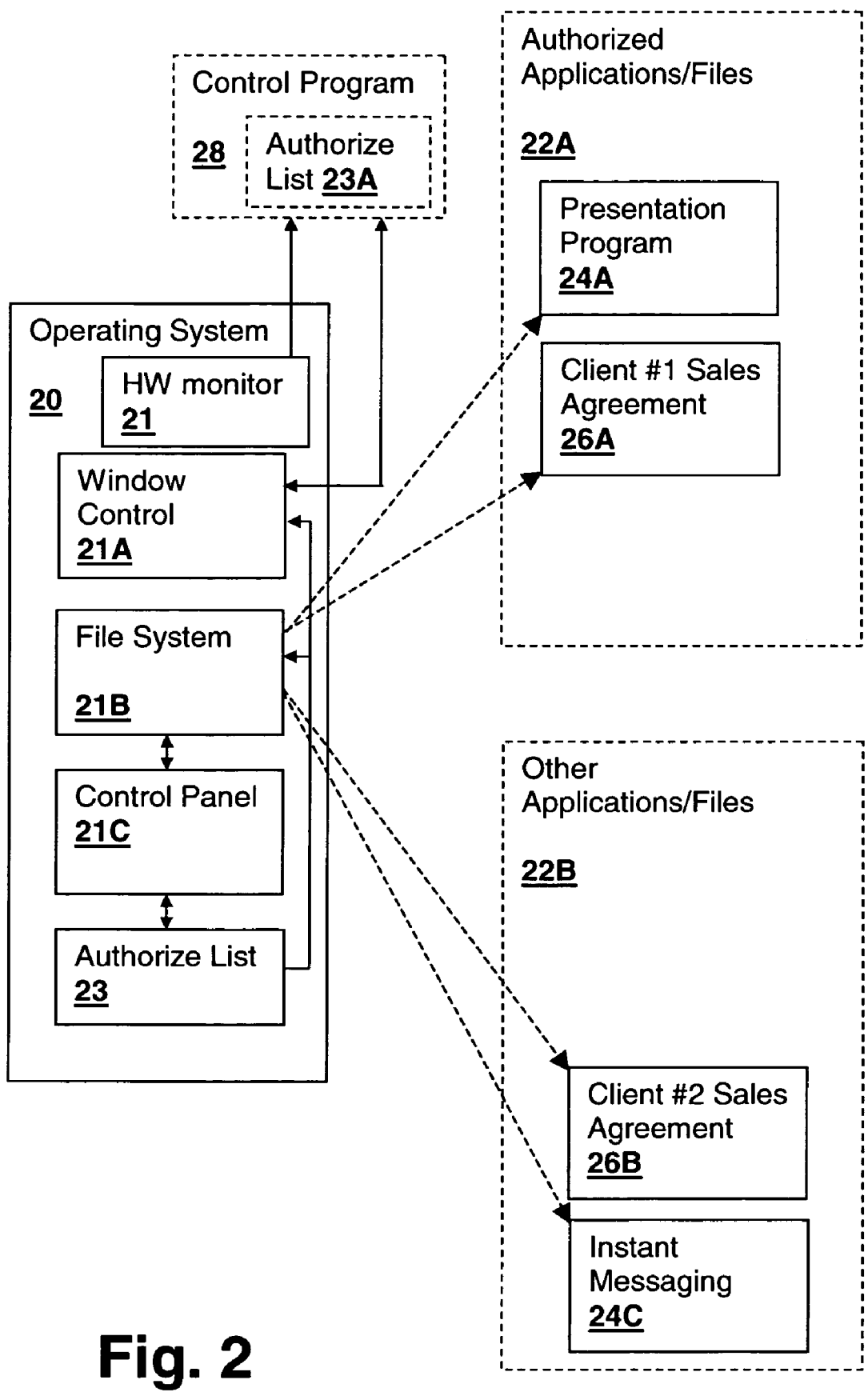
FIG. 2 is a block diagram showing memory organization of software modules in a computer system in accordance with an embodiment of the present invention.

Referring now to FIG. 2, an organization of software modules in notebook computer 10 is depicted in a block diagram. Operating system 20 is a general-purpose computer operating system such as WINDOWS, a product of Microsoft Corporation, to which the terminology of the present application directly applies. However, it should be understood by one of ordinary skill in the art that techniques taught herein apply also to alternative operating systems and platforms, and that changes in terminology or variants in structure associated with the operating system may be made without exceeding the scope of the invention. For example, in an event-driven operating system, the language used herein to describe message hooks does not apply, but event handlers can be produced that provide the same actions when a window order altering event is fired. Also, in operating systems where the underlying file system does not recognize application launching as "opening" an executable file, an equivalent process for launching an application file should be recognized and applied. In such cases, data files such as documents and applications such as presentation managers may require separate treatment and authorization lists or attribute settings.

Operating system 20 includes all modules necessary to execute applications, services, support hardware and user interfaces on a general-purpose computer system. In particular, with respect to the illustration of the present invention, operating system 20 includes a hardware monitor 21 that detects bus activity and maintains information on attached devices, such as projector 12. Operating system 20 also includes a file system 21B that is responsible for opening files and launching applications and a window control module 21A that controls what windows are displayed and in what order. Operating system 20 of the present invention also includes a control panel 21C for setting parameters of an external control program 28, which performs methods in accordance with an embodiment of the present invention. Control panel 21C is used to manage an "authorize" list 23 that may alternatively be contained in control program 28, that lists the files permitted for opening during a presentation. Opening in the context of the present invention (as well as in the terminology of WINDOWS) includes commencing execution of a program or service. Control program 28 along with authorize list 23 or 23A may be included entirely within operating system 20, may be a separate service application, or may be included within presentation managers such as POWERPOINT (a product of Microsoft Corporation) or LOTUS FREELANCE GRAPHICS (a product of International Business Machines Corporation). Control panel 21C may also be located along with control program 28 in any of the above-listed executable programs.

Application and data files within notebook computer 10 are illustrated in the right-hand side of FIG. 2. Authorized applications/files 22A illustrates a presentation program 24A and a data file 26A that may be opened at all times and are so authorized by control program 28 because files 22A and 24A are included in authorize list 23. Unauthorized applications/files 22B are not opened when a presentation is in progress and are illustrated as including a document 26B (a sales agreement for a client other than the client for which the presentation is being made) and an instant messaging application 24C that might pop up during the presentation and display personal messages directed at the presenter.

The method of the present invention blocks the above-mentioned applications and /or opening of other files such as documents when a presentation is active. Determination of whether or not a presentation is active may be made using the hardware scheme disclosed above where the display adapter in use sets the criteria. Or, a mode may be set in presentation program 24A or in control panel 21C that simply activates application/file blocking when selected by the user. Another alternative is to detect when presentation program 24A is active and to block unauthorized window focus or file opening during that time. Combinations of the above techniques may also be used, such as determining that projector 12 is connected while presentation program 24A is active. Setting of the mode may also be made within presentations via a macro or keyword, so that the presentation may control application blocking. Different authorize lists 23 may also be provided and populated for each presentation.

There are several alternative mechanisms by which the method of the presentation may block the display of windows generated for document 26B and instant messaging application 24C. The technique used is largely dependent on where control program 28 is located. If operating system 20 is modified to contain control program 28, then file system 21B can set a special file attribute for authorized files when control panel 21C sets up the authorizations, permitting only those files to be opened during a presentation. In such cases, authorize list 23 may not be needed, as the requisite information is contained in the file attributes. Alternatively, authorize list 23 may be used by file system 21B to verify whether or not to open a file during a presentation.

Alternatively, operating system 20 or an external control program 28 (such as a separate program/service or presentation application) may "hook" the message stream and determine when a window is about to gain focus. If the window does not belong to an authorized application, or if the window is associated with a data file that is not authorized, the focus can be shifted back to an authorized window immediately, so that the unauthorized window does not display or only displays momentarily. Another alternative is to hold focus using a modal window, until an authorized application attempts to gain focus (as long as any document that is associated with the window is also authorized).

In general it is only necessary to: 1) determine that a presentation is active; 2) determine that an application or file is being opened or that a window is getting focus; 3) determine whether the opening file or window is authorized; and 4) selectively permit the file to be opened or the window to have focus.

Figure 3:
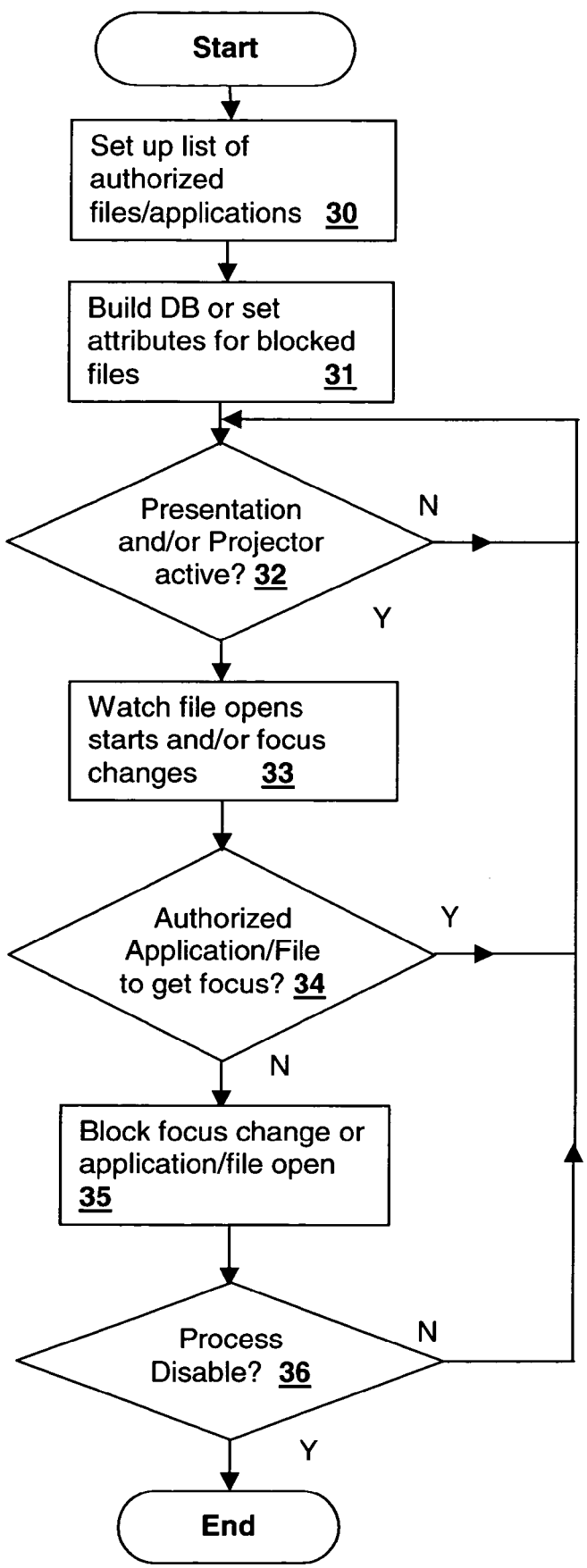
FIG. 3 is a flow chart of a method in accordance with an embodiment of the present invention.

Referring now to FIG. 3, a method in accordance with an embodiment of the invention is illustrated in a flowchart. First, a list of authorized files is built (step 30). Next, either a database is built, or attributes are set for the authorized files (step 31). Then, if a presentation (and/or projector) is active (decision 32), the control program watches for file opens (including application starts) and/or focus changes (step 33). When a focus change or file open occurs, if an authorized file is to get the focus (decision 34), the focus change/file open is permitted. If an unauthorized application/file is to get the focus (decision 34), then the file/application open or focus change is blocked (step 35). The above process is repeated until it is disabled (decision 36).

The above-described method is only one possible embodiment of the present invention, which extends to variations on the basic method in order to achieve the goal of preventing unexpected intrusions or exposure of data during presentations. For example, the method may be reversed to build a list of unauthorized files, rather than a list of authorized files. While such a list would generally not be exhaustive, it could suffice to provide for blocking of sensitive files and pop-up applications.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for controlling use of a computer screen during a computer-generated presentation, the method comprising:

building a list of executable or document files for which corresponding windows are permitted to have screen focus during said computer-generated presentation;

first determining whether or not a computer-generated presentation is active;

in response to determining that said computer-generated presentation is active, second determining whether or not a particular executable or document file has a corresponding window that is about to obtain a focus of said computer screen;

in response to determining that said corresponding window is about to obtain said focus, third determining whether or not said particular executable or document file is in said list of files; and in response to determining that said particular executable or document file is not in said list of files, preventing said corresponding window from obtaining said focus.

2. The method of claim 1, wherein said particular executable or document file is a currently open file, wherein said second determining determines whether or not a window generated for said particular executable or document file will obtain said focus, and wherein said preventing is performed by denying access to said focus by said window.

3. The method of claim 1, wherein said particular executable or document file is not a currently open file, and wherein said preventing is performed by blocking opening of said particular executable or document file.

4. The method of claim 1, wherein said particular executable or document file is a service providing a pop-up window in response to an activity generated by an automatic process outside of said computer-generated presentation, and wherein said preventing is performed by denying access to said focus by said pop-up window.

5. The method of claim 1, further comprising detecting whether or not a particular display port is active, and wherein said first determining determines that said computer-generated presentation is active in conformity with detecting that said particular display port is active.

6. The method of claim 1, further comprising detecting whether or not a particular display type is active, and wherein said first determining determines that said computer-generated presentation is active in conformity with detecting that said particular display type is active.

7. The method of claim 1, further comprising detecting whether or not a presentation program is active, and wherein said first determining determines that said presentation program is active in conformity with a result of said detecting.

* * * * *